Oct. 7, 1924.
W. M. ROLPH
1,510,500
SIGNALING APPARATUS FOR VEHICLES
Filed July 9, 1923  2 Sheets-Sheet 2
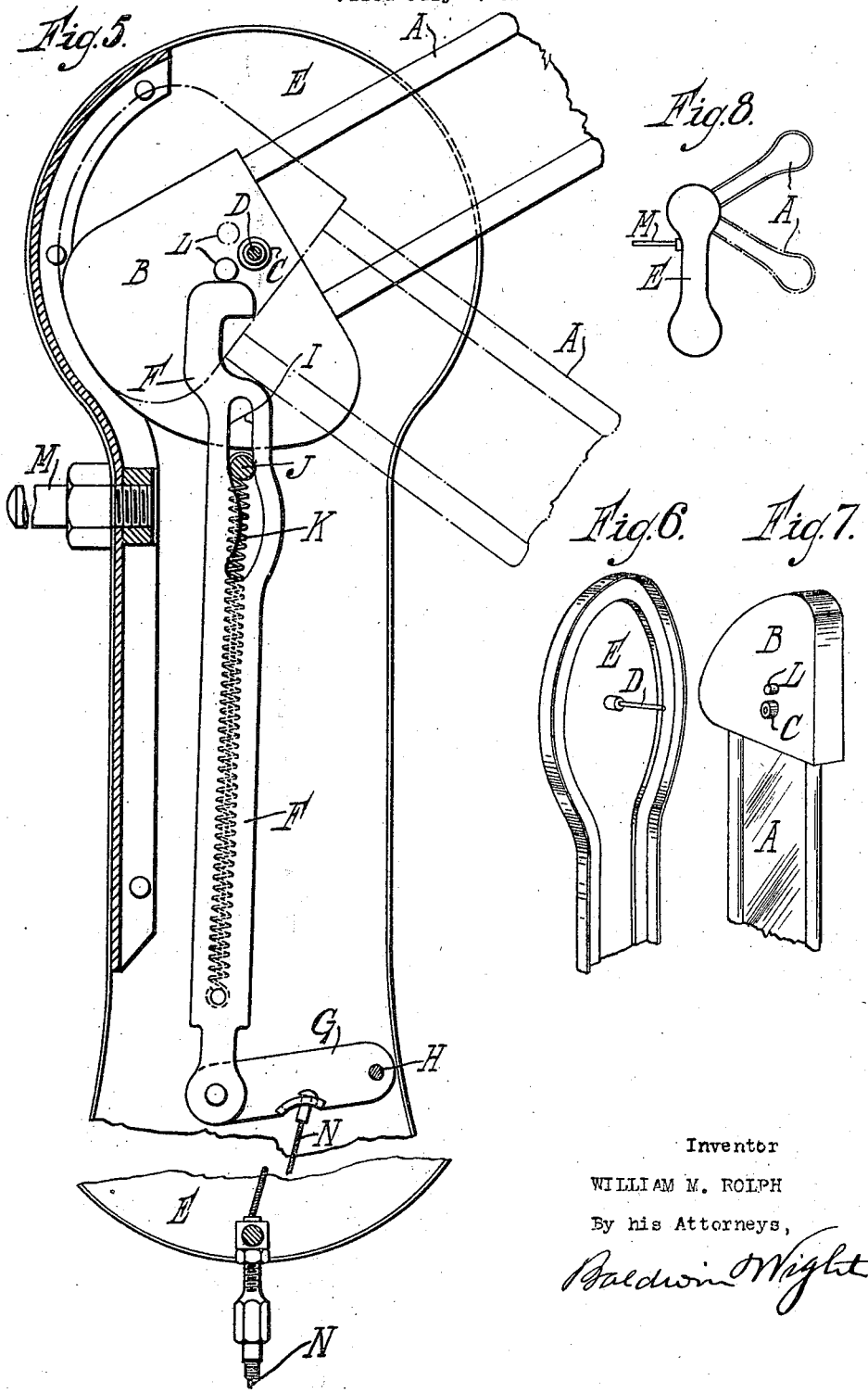
Inventor
WILLIAM M. ROLPH
By his Attorneys,
Baldwin & Wight Patented Oct. 7, 1924.

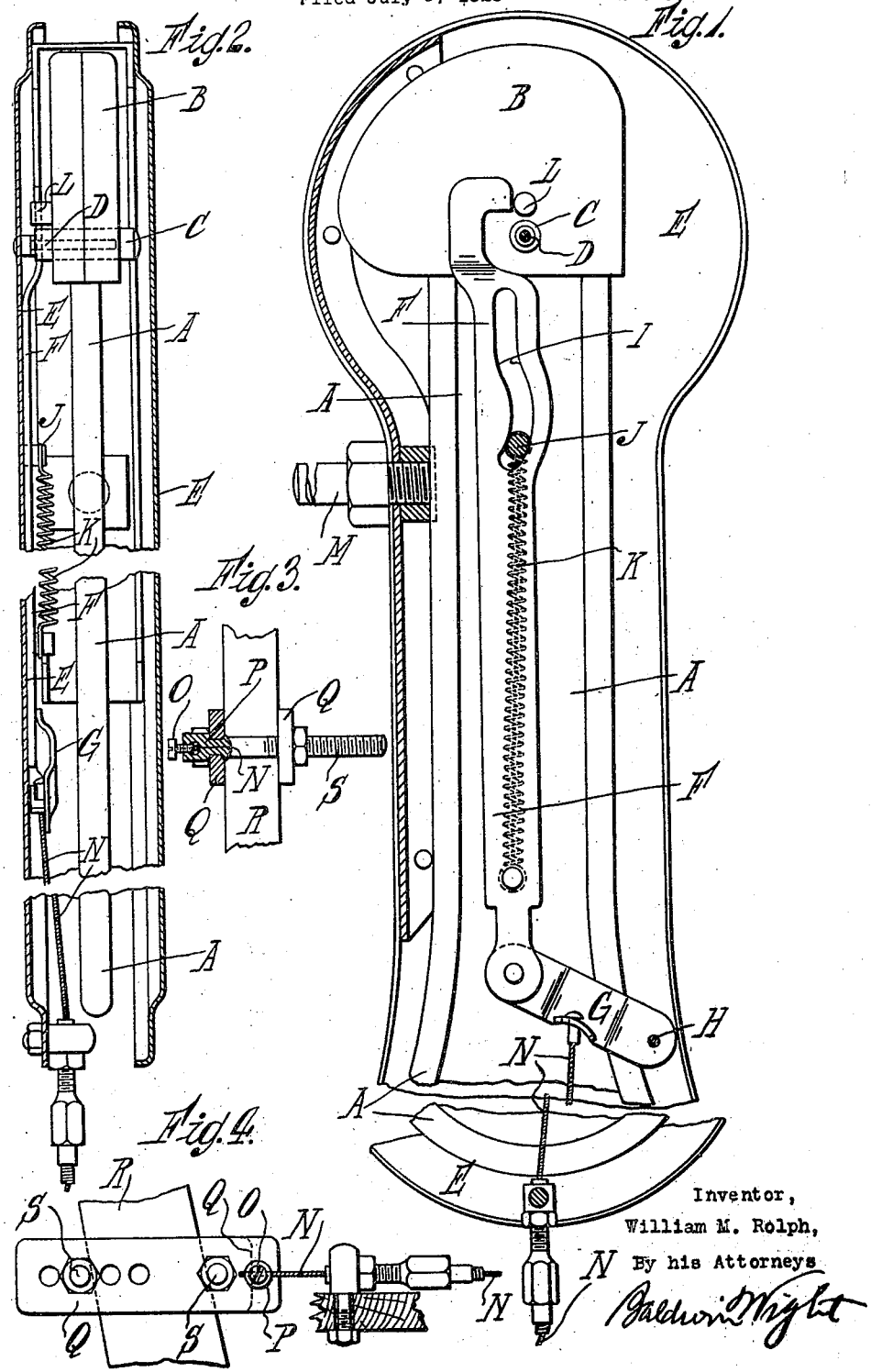

1,510,500

UNITED STATES PATENT OFFICE.

WILLIAM MAIR ROLPH, OF LONDON, ENGLAND.

SIGNALING APPARATUS FOR VEHICLES.

Application filed July 9, 1923. Serial No. 650,446.

*To all whom it may concern:*

Be it known that I, WILLIAM MAIR ROLPH, a subject of the King of Great Britain, residing at 66 Piccadilly, London, England, have invented a new and useful Improvement in Signaling Apparatus for Vehicles, of which the following is a specification.

This invention relates to signaling apparatus for use on vehicles, its principal object being to provide a simple means by which the driver of an automobile can indicate to a following vehicle that he is about to slow down.

The invention is illustrated in the accompanying drawings, Figure 1 of which is a vertical transverse section through the case of the apparatus, Figure 2 is a view at right angles to Figure 1, Figures 3 and 4 show how the wire may be connected to the brake pedal, Figure 5 is a view similar to Figure 1 showing the signaling arm in extreme position in full lines and in intermediate position in dotted lines, Figure 6 is a view of a portion of the casing, Figure 7 is a similar view of the cooperating portion of the arm and weight, and Figure 8 is a diagrammatic representation of the operative position of the signaling arm.

A is the indicating arm, that end of which is normally uppermost carrying a weight B on which is a socket C embracing a pivot pin D carried by the casing E. F is a rod the lower end of which is pivoted to a lever arm G which is itself pivoted to the casing at H. The rod has in it a curved slot I working upon a fixed pin J to which is secured the top of a spring K, the bottom of which is anchored to the rod F. The top of the rod engages a stud L on the weight B. The casing is carried by a horizontal rod M by which it can be secured to the wind screen of a car. To the lever arm G is secured one end of a Bowden wire N, the other end of which is clamped by a screw O in a transverse hole in a rivet or stud P carried by one of two plates Q, Q, which are secured on the brake pedal R by bolts S.

The arm A is maintained in the inoperative position in which it is shown in the drawing by the top of the rod F engaging the stud L. When, however, the brake pedal is depressed the wire N is pulled and the rod F is moved downwards, and the arm A is therefore freed and the weight B causes it to move counter-clockwise as shown in Figure 1, so that it will oscillate about the fixed pin D and indicate to vehicles behind that the vehicle on which it is mounted is stopping, the oscillating movement of the arm being similar to the oscillating movement of the hand of a driver of an automobile by which he signals to following vehicles that he is about to slow down or stop.

As soon as the brake pedal is released and the pull on the wire N thereby slackened spring K moves the rod F upwards and the top of the rod acting upon the stud L restores the arm to its inoperative position, that is, brings it back into its casing.

It will be seen that the shape of the slot I is such that the rod F is moved slightly to the left as it begins to descend in order to allow the stud L to move in a circular arc round the axis of the pin D.

What I claim is:—

1. In signaling apparatus for use on vehicles, the combination of a weighted indicating arm capable of free oscillation under the influence of gravity alone about a horizontal axis and a rod so arranged as normally to lock the indicating arm but capable of a sliding movement to release the arm.

2. In signaling apparatus for use on vehicles, the combination of a weighted indicating arm capable of oscillation about a horizontal axis, a projection on the arm and a rod normally engaging the projection to lock the arm but capable of a sliding movement to release the arm.

3. In signaling apparatus for use on vehicles, the combination of a weighted indicating arm capable of free oscillation under the influence of gravity alone about a horizontal axis, a rod capable of a sliding movement and a spring tending to hold the rod in a position which locks the arm.

4. In signaling apparatus for use on vehicles, the combination of a weighted indicating arm capable of free oscillation under the influence of gravity alone about a horizontal axis, a projection on the arm, a rod capable of a sliding movement and a spring tending to hold the rod against the projection to lock the arm.

5. In a vehicle, the combination of a weighted indicating arm capable of free oscillation under the influence of gravity alone about a horizontal axis, locking means for restraining the arm from oscillation, a brake pedal and means actuated by the brake pedal for withdrawing the locking means and releasing the arm.

6. In a vehicle, the combination of a weighted indicating arm capable of free oscillation under the influence of gravity alone about a horizontal axis, a rod capable of a sliding movement, a spring tending to hold the rod in such a position that it restrains the arm from oscillation, a brake pedal and means actuated by the movement of the brake pedal for sliding the rod against the spring.

7. In signaling apparatus for use on vehicles, the combination of a casing, a weighted indicating arm capable of free oscillation under the influence of gravity alone about a horizontal axis, a rod located within the casing and capable of a sliding movement and a spring tending to hold the rod in a position which retains the arm within the casing.

8. In signaling apparatus for use on vehicles, the combination of a casing, a weighted indicating arm capable of oscillation about a horizontal axis, a projection on the arm, a rod capable of a sliding movement within the casing and a spring tending to hold the rod against the projection to retain the arm within the casing.

9. In signaling apparatus for use on vehicles, the combination of a weighted indicating arm capable of free oscillation under the influence of gravity alone about a horizontal axis, a rod so arranged as normally to lock the indicating arm and means for imparting a sliding movement to the rod to release the arm.

10. In signaling apparatus for use on vehicles, the combination of a weighted indicating arm capable of free oscillation under the influence of gravity alone about a horizontal axis, a projection on the arm, a rod normally engaging the projection to lock the arm and means for imparting a sliding movement to the rod to release the arm.

11. In signaling apparatus for use on vehicles, the combination of a casing, a weighted indicating arm capable of free oscillation under the influence of gravity alone about a horizontal axis carried by the casing, a rod so arranged as normally to hold the indicating arm within the casing and means for imparting a sliding movement to the rod to release the arm.

12. In signaling apparatus for use on vehicles, the combination of a casing, a weighted indicating arm capable of free oscillation under the influence of gravity alone about a horizontal axis carried by the casing, a rod, a spring tending to hold the rod in a position which locks the arm, a lever pivoted to the casing and to the rod and means for turning the lever about its pivot.

13. In signaling apparatus for use on vehicles, the combination of a casing, a pin carried thereby, a weighted indicating arm journalled on the pin and capable of free oscillation thereon under the influence of gravity alone, a projection on the arm, a rod located within the casing and capable of a sliding movement, a spring tending to hold the rod against the projection to lock the arm, a lever pivoted to the casing and to the rod and means for rocking the lever about its pivot.

In testimony that I claim the foregoing as my invention I have signed my name this 27th day of June, 1923.

WILLIAM MAIR ROLPH.